O. A. PARKER.
DEMOUNTABLE RIM.
APPLICATION FILED MAR. 17, 1917.
1,376,035.
Patented Apr. 26, 1921.
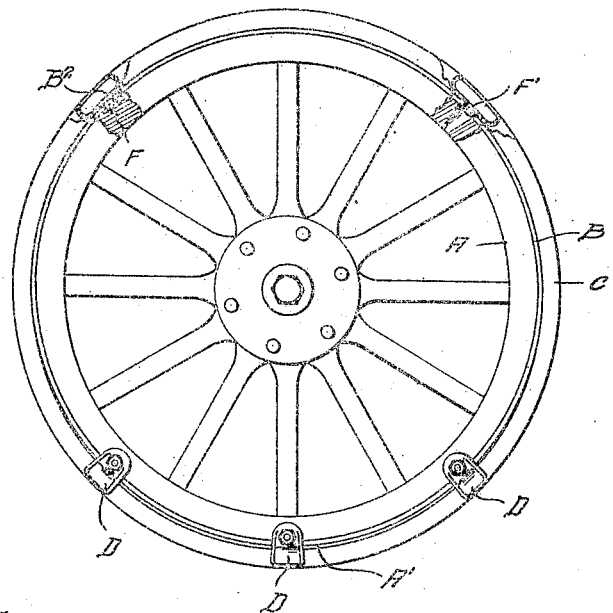
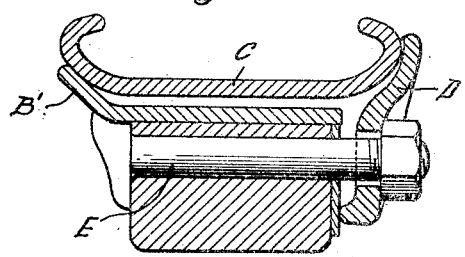
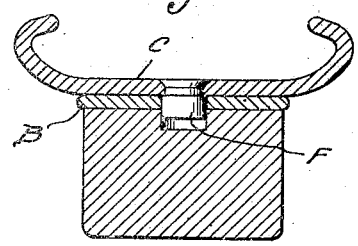
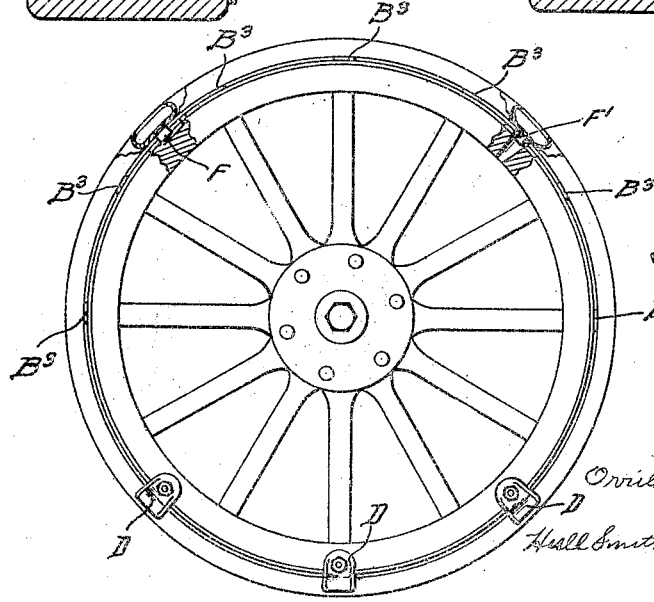
Inventor
Orville A. Parker.
Hull Smith Brock & West
Attys.

UNITED STATES PATENT OFFICE.

ORREL A. PARKER, OF CLEVELAND, OHIO.

DEMOUNTABLE RIM.

1,376,035.  Specification of Letters Patent.  Patented Apr. 26, 1921.

Application filed March 17, 1917. Serial No. 155,488.

*To all whom it may concern:*

Be it known that I, ORREL A. PARKER, a citizen of the United States, residing at Cleveland, in the county of Cuyahoga and State of Ohio, have invented a certain new and useful Improvement in Demountable Rims, of which the following is a full, clear, and exact description, reference being had to the accompanying drawings.

This invention relates generally to demountable rims and more particularly to means for securing the demountable tire carrying rim to the wheel body. Various devices have been employed for securing the demountable tire carrying rims upon wheels but all or nearly all, of these devices have required a number of separated parts which called for considerable care and skill in their manipulation in order to fasten the rim upon the wheel in a true plane and properly centered.

With the idea of dispensing with a large number of these parts and consequently eliminating many of the operations I have devised the present rim fastening means, and generally speaking the invention consists in certain details of construction and novelties of arrangement all of which will be fully described hereinafter and pointed out in the claims.

In the drawings forming part of this specification Figure 1 is a face view of a wheel embodying my invention; Fig. 2 is a sectional view taken on the line 2—2 of Fig. 1; Fig. 3 is a section on the line 3—3 of Fig. 1; and Fig. 4 is a face view showing a slight modification.

In the practical embodiment of my invention I employ a wheel A one half of which is concentric and the other half eccentric, this half of the wheel being rendered eccentric by removing a very small portion of the wooden felly as indicated at A'. If desired the wheel can be made eccentric with certain negligible inaccuracies by placing the hub bore slightly to one side of the true center of the wheel. Upon this eccentric wheel is fastened the metal felly band B having the inclined flange B' at the inner edge thereof, upon the eccentric portion only of the wheel or a part of said eccentric portion. The tire carrying rim C is as near a true circle as such rims are made commercially and is adapted to fit upon the wheel body; one half of the rim fitting upon the concentric portion of said wheel body while the other half of the rim drops freely about the eccentric portion of the wheel body and comes in contact with the flange B' at the inner edge of the felly band, and in order to tension the rim upon the wheel body I provide lateral clamps D arranged upon the ends of bolts E passing through the eccentric portion of the wheel felly and these clamps bind against the outer flange of the rim and force the opposite edge of the rim into contact with the inclined flange B' thereby drawing the other half of the rim firmly into contact with the concentric portion of the felly band and tensioning the rim as a whole and securing it firmly upon the wheel body. The wheel body is made eccentric only for the purpose of enabling the rim to be quickly rocked or buttoned or swung thereon or removed therefrom and consequently the three lateral clamps acting upon the rim will be sufficient to tension the entire rim and firmly bind the rim upon the concentric portion of the wheel body and securely wedge the other portion of the rim against the flange of the felly band upon the eccentric portion of the wheel.

A dowel F is attached to the rim and fits into a suitable elongated recess $B^2$ made in the felly band and a second dowel or driving lug F' tubular in form, is attached to the rim and spaced about 90° therefrom and through which the valve stem of the tire is adapted to pass, this driving lug serving the double function of a guide for the valve stem and positioning the rim upon the wheel body in all directions: and by placing the dowels or lugs F and F' a considerable distance apart, as indicated, lateral supports will be provided for the concentric portion of the rim at widely spaced points, which, in connection with the three lateral clamps, will be found amply sufficient to securely fasten the rim upon the wheel. In Fig. 4, I have shown a slight modification in which the upper half of the wheel body is provided with blocks or strips $B^3$ for the purpose of making a portion of the wheel eccentric with reference to the rest, the lower half of the wheel being devoid of such spacing blocks or strips. In this construction one half of the rim will rest upon the spacing blocks or strips, while the other half will fall freely over the felly band devoid of such blocks and strips, and when the clamps are applied and the rim tensioned the upper half of said rim will be drawn down firmly upon the blocks or strips exactly the same as previously described. A dowel or dowels near the valve stem, and approximately at the center of the concentric portion of the wheel, in connection with the lateral clamps upon the opposite side of the wheel will be sufficient to properly secure the rim upon the wheel body.

In operation, the valve stem and dowels are brought into engagement with their recesses thereby positioning the concentric portion of the wheel. The rim is then dropped around the eccentric portion of the wheel body and contacts with the flange at the back and then by tightening up the lateral clamps the rim will be securely fastened upon the wheel in a true plane and properly centered.

The removal of the rim can be quickly and easily accomplished by simply unfastening the lateral clamps, turning them out of engagement with the rim and pulling the rim off as usual.

It will thus be seen that I properly and securely fasten a demountable tire carrying rim upon a wheel body by the use of a minimum number of fastening elements, and at the same time avoid the common error of mounting a rim off center and out of its true plane.

It is obvious that the blocks referred to in Fig. 4 may be attached to the rim instead of to the felly band, without in any way changing the results obtained.

Having thus described my invention, what I claim is:—

1. The combination with a wheel body, a portion of which is concentric and the remaining portion eccentric, of a felly band affixed thereto and having an inclined flange at the back, a demountable tire carrying rim adapted to fit upon said felly band, and rim fastening means attached to the eccentric portion of the wheel body and contacting with that portion of the rim contiguous to the eccentric portion of the wheel body.

2. The combination with a wheel body, a portion of which is concentric and the remaining portion eccentric, of a felly band affixed thereto and having an inclined flange at its back, a demountable tire carrying rim and clamps attached to the eccentric portion of the wheel body and bearing against the side portion of the rim contiguous to said eccentric portion of the wheel body whereby a portion of the rim is drawn down on the concentric portion of the felly band and the remaining portion is tensioned against the inclined flange.

3. The combination with a wheel body, one portion of which is eccentric, of a felly band affixed to said wheel body, the eccentric portion of the felly band having an inclined flange at its back, a demountable tire carrying rim adapted to fit upon said wheel body, and lateral clamping means carried by the eccentric portion of the wheel body and adapted to contact with the contiguous portion of said rim to bind the same against the inclined flange.

4. The combination with a wheel body, a portion of which is eccentric, a felly band affixed thereto, the eccentric portion of said felly band having an inclined flange at its back, a demountable tire carrying rims having dowels spaced at considerable distance and adapted to engage the concentric portion of the wheel body and lateral clamps carried by the eccentric portion of said wheel body, adapted to contact with the contiguous portion of said rim to bind same against inclined flange.

5. The combination with a wheel body, a portion of which is concentric and the remaining portion eccentric and having an inclined flange at the back, of a demountable tire carrying rim, and clamps attached to the eccentric portion of wheel body and bearing against the contiguous portions of the tire carrying rim to bind the same against the inclined flange at the back of said portion.

In testimony whereof I hereunto affix my signature.

ORREL A. PARKER.